United States Patent
Christy

(10) Patent No.: US 9,390,175 B2
(45) Date of Patent: Jul. 12, 2016

(54) SYSTEMS AND METHODS FOR DETERMINING THE OPERATING HOURS OF AN ENTITY

(71) Applicant: Google Inc., Mountain View, CA (US)

(72) Inventor: Robert William Christy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 509 days.

(21) Appl. No.: 13/647,758

(22) Filed: Oct. 9, 2012

(65) Prior Publication Data

US 2015/0178355 A1    Jun. 25, 2015

(51) Int. Cl.
   *G06F 17/30*    (2006.01)

(52) U.S. Cl.
   CPC .... *G06F 17/30864* (2013.01); *G06F 17/30241* (2013.01)

(58) Field of Classification Search
   CPC .................................................. G06F 17/30241
   USPC ......................................................... 707/776
   See application file for complete search history.

(56) References Cited

U.S. PATENT DOCUMENTS

| 8,566,014 | B1* | 10/2013 | Kozolchyk | ......... G01C 21/3679 701/300 |
| 2006/0101005 | A1* | 5/2006 | Yang et al. | ........................ 707/3 |
| 2009/0319904 | A1 | 12/2009 | Rensin et al. | |
| 2010/0161490 | A1 | 6/2010 | Alrabady et al. | |
| 2010/0211308 | A1* | 8/2010 | Zheng et al. | ................... 701/201 |
| 2010/0235218 | A1 | 9/2010 | Erhart et al. | |
| 2011/0131243 | A1* | 6/2011 | Aben et al. | .................... 707/771 |
| 2011/0196926 | A1 | 8/2011 | Crawford | |
| 2012/0124176 | A1* | 5/2012 | Curtis et al. | ................... 709/219 |
| 2013/0151612 | A1* | 6/2013 | Dunn | .................... G06Q 10/00 709/204 |

FOREIGN PATENT DOCUMENTS

| EP | 1385127 A1 | 1/2004 |
| JP | 2003091755 A | 3/2003 |

OTHER PUBLICATIONS

Jonas Flodin, Social Networks in an NFC Context, Master's Thesis, Lulea University of Technology, Aug. 23, 2010, 45 pages, 2010:163 CIV—ISSN:1402-1617, ISRN:LTU-EX-10/163-SE.

* cited by examiner

*Primary Examiner* — Kris Mackes

(74) *Attorney, Agent, or Firm* — Dority & Manning, P.A.

(57) ABSTRACT

Provided are systems, methods, and computer program products for determining operating hours of entities from user check-ins and check-outs. A method for determination operating hours may include obtaining check-in and check-out data for an entity having operating hours, aggregating the check-in and check-out data over an aggregation period, and determining a start time and an end time of the operating hours of the entity. The method may include aggregating the check-in and check-out data over multiple aggregation periods and determining operating hours for different aggregation periods.

17 Claims, 12 Drawing Sheets

SYSTEMS AND METHODS FOR DETERMINING THE OPERATING HOURS OF AN ENTITY

BACKGROUND OF THE INVENTION

1. Field of the Invention

This invention relates generally to improving information about a business or other entity, and more particularly, to determining the hours of operation of a business or other entity having operating hours.

2. Description of the Related Art

The Internet and the World Wide Web (WWW) are useful for a variety of purposes. For example, users may use the Internet to retrieve information about businesses, government offices, public places such as parks and libraries, etc. Some of the information for these entities may be available from a third party, such as a website listing information for businesses, parks, and other points of interest in a geographic area. The information on such websites may include different information about a business or other entity, such as the name of the business, the location of the business, the menu (if the business is restaurant), etc.

Some of the websites and other applications may purport to list the operating hours of the business. However, the operating hours may be incorrect or unverified, and such misinformation may result in users visiting the business outside of the actual operating hours. Moreover, obtaining the operating hours for a business or other entity may be time-consuming and challenging, and may require contacting the business and other entities directly. Additionally, obtaining the operation hours for a business or other entity may involve reliance on inaccurate sources, such as users manually reporting the operating hours, outdated websites, or other unreliable data sources.

SUMMARY OF THE INVENTION

In some embodiments, a computer-implemented method for determining the operating hours of an entity is provided that includes obtaining, by one or more processors, a first plurality of timestamps, the first plurality of timestamps corresponding to the physical presence of a first plurality of users of a first plurality of portable computers at an entity having a location and operating hours, the operating hours having a start time and an end time, and obtaining, by the one or more processors, a second plurality of timestamps corresponding to the physical absence of a second plurality of users of a second plurality of portable computers from the entity. The method further includes determining, from the first plurality of timestamps and by the one or more processors, a first time, determining, from the second plurality of timestamps and by one or more processors, a second time, and assigning, by the one or more processors, the first time and the second time as the start time end time of the operating hours of the entity.

In some embodiments, a non-transitory tangible computer-readable storage medium is also provided. The non-transitory tangible computer-readable storage medium has executable computer code stored thereon, the code having a set of instructions that, when executed by one or more processors, causes a computer to: obtain, by one or more processors, a first plurality of timestamps, the first plurality of timestamps corresponding to the physical presence of a first plurality of users of a first plurality of portable computers at an entity having a location and operating hours, the operating hours having a start time and an end time; obtain, by the one or more processors, a second plurality of timestamps corresponding to the physical absence of a second plurality of users of a second plurality of portable computers from the entity; determine, from the first plurality of timestamps and by the one or more processors, a first time; determine, from the second plurality of timestamps and by one or more processors, a second time; and assign, by the one or more processors, the first time and the second time as the start time and end time of the operating hours of the entity.

In some embodiments, another computer-implemented method for determining the operating hours of an entity is provided. The method includes obtaining, by one or more processors, data indicative of a plurality of check-ins and check-outs at an entity having a location and operating hours, aggregating, by the one or more processors, the data over a first aggregation period and a second aggregation period, determining from the aggregated data, by the one or more processors, a first start time, a first end time, or both, for the first aggregation period from the aggregated data, and assigning the first start time, the first end time, or both, as the operating hours of the entity for the first aggregation period.

In some embodiments, a non-transitory tangible computer-readable storage medium is also provided. The non-transitory tangible computer-readable storage medium has executable computer code stored thereon, the code having a set of instructions that, when executed by one or more processors, causes a computer to: obtain, by one or more processors, data indicative of a plurality of check-ins and check-outs at an entity having a location and having operating hours; aggregate, by the one or more processors, the data over a first aggregation period and a second aggregation period; determine from the aggregated data, by the one or more processors, a first start time, a first end time, or both, for the first aggregation period from the aggregated data; and assign the first start time, the first end time, or both, as the operating hours of the entity for the first aggregation period.

In some embodiments, another computer-implemented method is provided that includes obtaining, by one or more processors, one or more timestamps associated with an entity having a location and operating hours, obtaining, by the one or more processors, the operating hours of the entity, the operating hours having a start time and an end time, comparing, by the one or more processors, the one or more timestamps to the start time to determine a first conflict between the one or more timestamps and the start time, comparing, by the one or more processors, the one or more timestamps to the end time to determine a second conflict between the one or more timestamps and the end time, and providing a notification to a user based on the first conflict, the second conflict, or a combination thereof.

Figure 1:
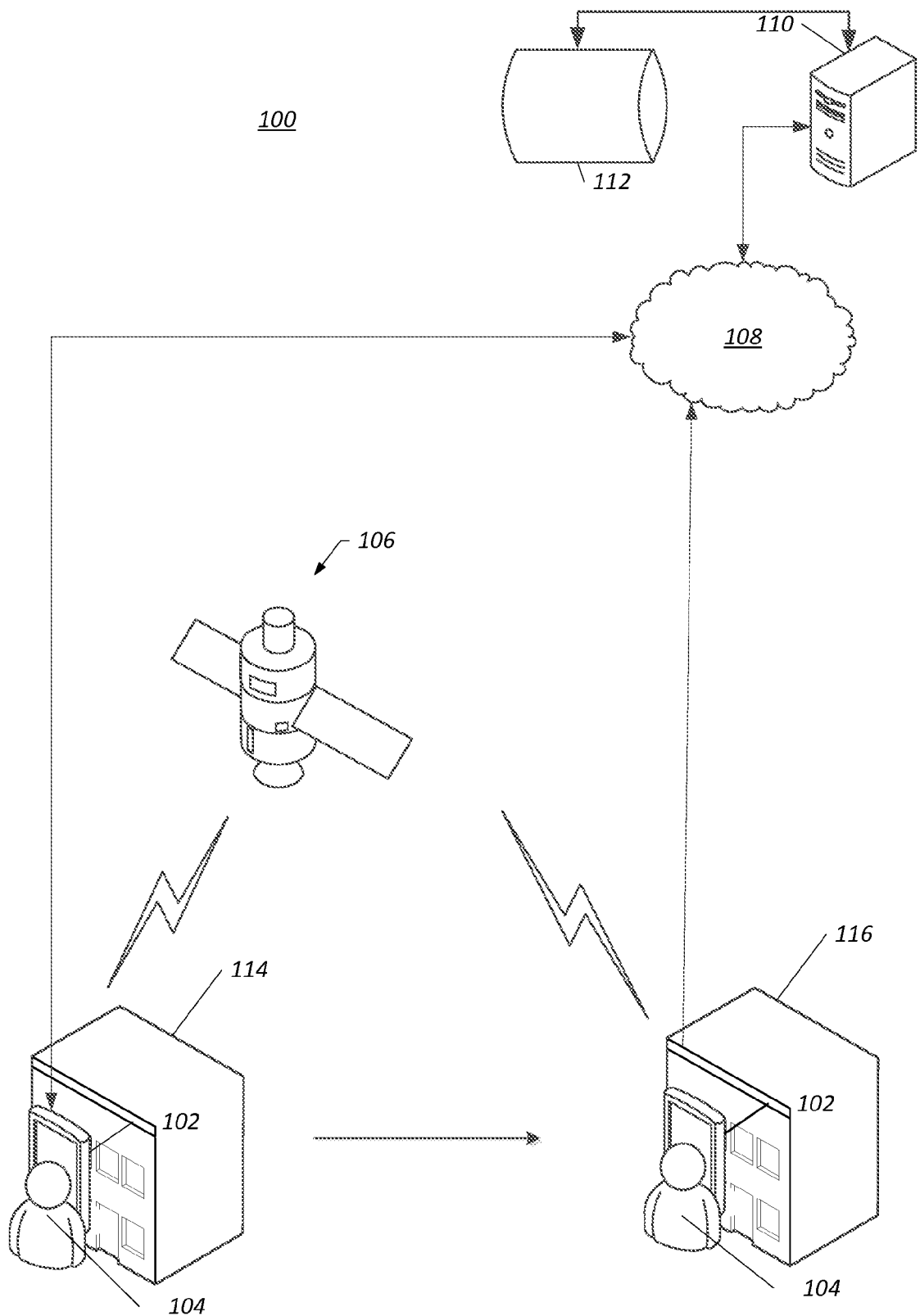
FIG. 1 is a schematic diagram that illustrates a system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As discussed in more detail below, provided in some embodiments are systems, methods, and computer program products for determining operating hours of an entity from user check-ins and check-outs. A user of a computer may check-in while at the entity to indicate the presence of the user at an entity having a physical location. A user may also check-out when leaving the entity to indicate the absence of the user from the entity. The check-ins and check-outs may be transmitted over a network and stored in a database for processing. The check-in and check-out data for an entity may be aggregated over an aggregation period to determine the operating hours of the entity. In some embodiments, a start time of the operating hours may be determined from the earliest check-in of the check-in and check-out data for an entity. Similarly, the end time of the operating hours may be determined from the latest check-out of the check-in and check-out data. In some embodiments, the check-in and check-out data may be collected over a duration of time, such as multiple weeks.

In some embodiments, the check-in and check-out data may be aggregated over multiple aggregation periods (e.g., weekdays and weekends). The estimation of operating hours of an entity may be compared to a confidence level, and user feedback may be requested based on the comparison. For example, a user may be presented with the option to input operating hours for the entity if the user clicks on a link. The operating hours received from a user may be used in the estimation of the operating hours from the check-in and check-out data. In yet other embodiments, the estimated operating hours may be compared to established data for the business. A conflict between the operating hours and established data may be submitted for resolution, such as by providing a notification to a user to contact the entity and obtain the operating hours.

FIG. 1 is a schematic diagram that illustrates a system 100 in accordance with an embodiment of the present invention. As shown in FIG. 1, the system 100 may include a computer, e.g., portable computer 102, for use by a user 104. The portable computer 102 may include laptop computers, tablet computers, smartphones, personal digital assistants, etc., and may include a receiver for a satellite-based navigation system 106, such as a Global Positioning System (GPS) receiver. The user 104 may use the portable computer 102 to retrieve information, view interactive maps, find destinations, determine routes to destinations, etc.

The portable computer 102 may be in communication with satellites of the aforementioned satellite-based navigation system 106 and with a network 108. For example, as the user 104 traverses a geographic area, the position of the portable computer 102 may be determined via communication with the satellite-based navigation system 106. The position may be stored on a memory of the portable computer 102 and, as described further below, may be transmitted over the network 108. In other embodiments, the position of the portable computer 102 may be determined with assistance of data received from the network 108, such as by assisted GPS (A-GPS). In other embodiments, the position of the portable computer 102 may be determined solely from data received from the network 108.

The portable computer 102 may be in communication with the network 108, such as through a network interface having a cellular antenna, a wireless Ethernet antenna, etc. In some embodiments, the network 108 may include multiple networks, such as a wireless Ethernet network, a cellular network, or other wireless networks. Moreover, it should be appreciated that the portable computer 102 may communicate over different networks separately and simultaneously. For example, the portable computer 102 may communicate over a wireless Ethernet network and a cellular network.

The portable computer 102 may communicate with a computer 110 via the network 108. In some embodiments, the computer 110 may be a part of a data center or distributed computing network. Additionally, the computer 110 may be a server and may have or be in communication with a database 112. As described further below, the portable computer 102 may transmit its present location, as determined via the satellite-based navigation system 106, to the computer 110 for processing in accordance with the techniques described below.

As shown in FIG. 1, the user 104 and portable computer 102 may be located at an entity 114. As used herein, the term "entity" refers to a private or public entity having a physical location, such as a business (e.g., restaurant, bar, store, etc.), a public facility (e.g., a park, library, etc.), a government office (e.g., Department of Public Safety (DPS) office, courthouse), etc. Moreover, as described further below, such entities may have operating hours. The operating hours for an entity may define the time period an entity is "open" and accessible to a user and when the entity is "closed" and not accessible to a user. For example, the operating hours may define when a user may shop at a business, enter a public facility, conduct transactions at a government office, etc.

The user 104 may use the portable computer 102 to locate the entity 114 in a geographic area, such as by searching the World Wide Web using a web-based search engine or by searching an interactive map of the geographic area. Additionally, the user 104 may use the portable computer 102 to indicate the user's physical presence at the entity 114. For example, the user 102 may use an application on the portable computer 102 to "check-in" at the entity 114 upon arrival at the entity 114. As described further below, data may be transmitted over the network 108 (e.g., to the computer 110) upon the user's check-in, such as the timestamp of the check-in, an entity identifier, the location of the portable computer 102, etc. In some embodiments, the check-in may be performed manually or automatically. For example, if an application executing on the portable computer 102 determines from the location data received from the satellite-based positioning system 106 that the portable computer 102 (and, presumably, the user 104) is physically located at the entity 114, the application may automatically check-in the user at the entity 114.

As also shown in FIG. 1, the user 104 and portable computer 102 may leave the entity 114 and move to another entity 116. When leaving the entity 114, the user may use an application on the portable computer 102 to indicate the user's physical absence from the entity 114. For example, the user 104 may use an application on the portable computer 102 to "check-out" from the entity 114 upon departure from the entity 114. Here again, as described further below, data may be transmitted over the network 108 (e.g., to the computer 110) upon the check-out, such as the timestamp of the check-out, an entity identifier, the location of the portable computer 102, etc. In some embodiments, the check-out may be performed manually or automatically. For example, if an application determines from the location data received from the satellite-based positioning system 106 that the portable computer 102 (and, presumably, the user 104) is not located at the entity 114, the application may automatically check-out the user from the entity 114. In some embodiments, a check-out may be associated with a check-in to ensure that check-ins and check-outs for the user 104 are consistent.

Similarly, when the user 104 arrives at the second entity 116, the user 104 may use an application on the portable computer 102 to indicate the user's physical presence (i.e., check-in) at the second entity 116. Here again, the user's check-in may result in the transmission of data over the network 108 (e.g., to the computer 110), such as the timestamp of the check-in, an entity identifier, the location of the portable computer 102, etc. Accordingly, when the user leaves the entity 116, the user may again use an application on the portable computer 102 to indicate the user's physical absence (i.e., check-out) from the second entity 116, and the user's check-out may result in the transmission of data over the network 108 (e.g., to the computer 110), such as the timestamp of the check-out, an entity identifier, the location of the portable computer 102, etc. In this manner, multiple users may check-in and check-out at various entities over time, enabling the collection of check-in and check-out data for these entities.

Figure 2:
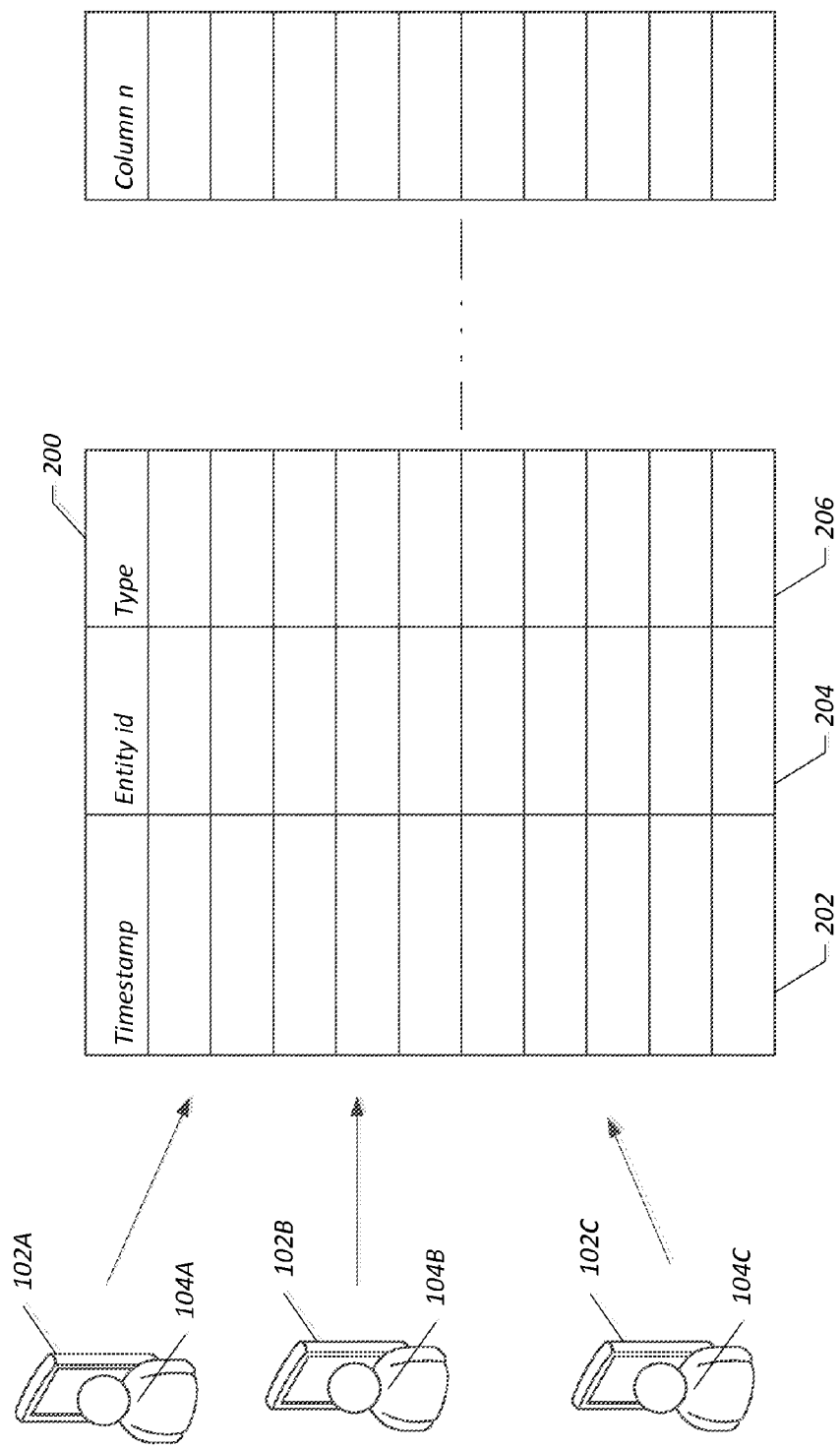
FIG. 2 is a schematic diagram illustrating the storing of check-in and check-out data in accordance with an embodiment of the present invention.

FIG. 2 depicts the collection and storing of check-in and check-out data in accordance with an embodiment of the present invention. As shown in FIG. 2, multiple users 104 may transmit check-in and check-out data from portable computers 102. For example, the user 104A may transmit check-in and check-out data from the portable computer 102A, the user 104B may transmit check-in and check-out data from the portable computer 102B, and the user 104C may transmit check-in and check-out data from the portable computer 102C, and so on.

As mentioned above, in some embodiments the check-in and check-out data may be manually transmitted, based on an action from the user, or automatically transmitted based on the user's physical presence or absence at an entity's location. The data may be received, such as by the computer 110, and stored, such as in the database 112. The data may be stored in any suitable data structure, such as a table 200. The table 200 may include for example, a timestamp 202 of the check-in or check-out (column "timestamp"), an entity identifier 204 (column "entity id"), and an identifier 204 indicating if the record is a check-in or check-out (column "type"). As used herein, the term "timestamp" refers to data indicating the date and/or time at which an event (e.g., a check-in or check-out) occurred. Embodiments of the invention may use any suitable format for the timestamp, such as a sequence of characters indicting the date and time, but are not limited to any specific timestamp format. The table 200 may include any other suitable data and number of columns (e.g., up to column n). Additionally, in some embodiments, check-in and check-out data may be distributed among multiple tables having, for example, foreign keys relating each table.

In some embodiments, each field of the table 200 may be received from the portable computers 102. For example, each portable computer 102A, 102B, and 102C may send a timestamp, an entity identifier, and a check-in/check-out identifier. In other embodiments, only some of the fields of a record of the table 200 may be received from a portable computer 102. For example, each portable computer 102 may only send a check-in and/or check-out identifier and entity identifier, and the timestamp may be determined by the receiving computer (e.g., computer 110) and stored in a record of the table 200. In other embodiments, the portable computer 102 may not send an entity identifier, but may only transmit the location of the portable computer 102. In such embodiments, the receiving computer (e.g., computer 110) may determine the entity located at the location of the portable computer 102 and store the appropriate entity identifier in the table 200.

Figure 3:
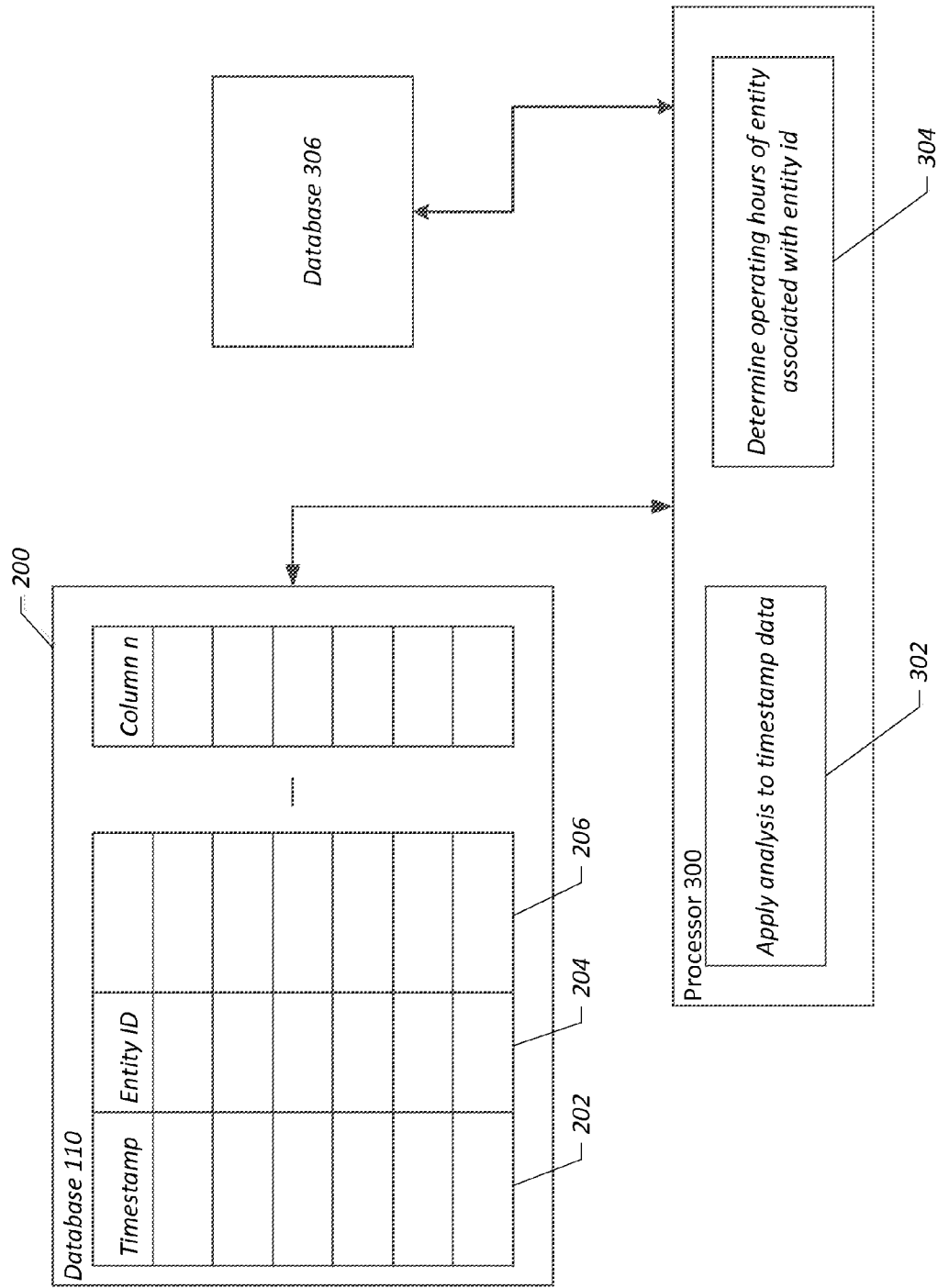
FIG. 3 is a block diagram illustrating the processing of check-in and check-out data in accordance with an embodiment of the present invention.

FIG. 3 is a block diagram of the processing of the check-in and check-out data stored in the table 200. As noted above, and as shown in FIG. 3, the data may be stored in the table 200 in the database 110. The table 200 may include multiple records received from multiple portable computers and may include records collected over a duration of time. The check-in and check-out data may be transmitted to a processor 300, such as a processor of the computer 110. For example, a portion of or all of the data stored in the table 200 may be transmitted over a network, such as the network 108, to the processor 300. The processor 300 may include a single processor or multiple processors, such as multiple processors of multiple computers of a data center, multiple data centers, or a distributed computer network.

Upon obtaining the check-in and check-out data, the processor 300 may analyze the check-in and check-out data for an entity, as described further below in FIGS. 4-8, to determine the operating hours of the entity. The processor 300 may identify the entity using the entity identifier stored in the table 200. For example, the operating hours (e.g., start time and end time) for a restaurant, bar, store or other entity may be determined based on the check-in and check-out data. The operating hours for an entity may subsequently be transmitted to and stored in another database, such as in a table. In some embodiments, the operating hours for an entity may be transmitted to and stored in the database 112 or a separate database 306. Upon requests from a computer, such as a search for the entity, the operating hours for an entity may be provided to the computer. In some embodiments, the operating hours may be listed on a webpage or other listing that includes information about the entity.

Figure 4:
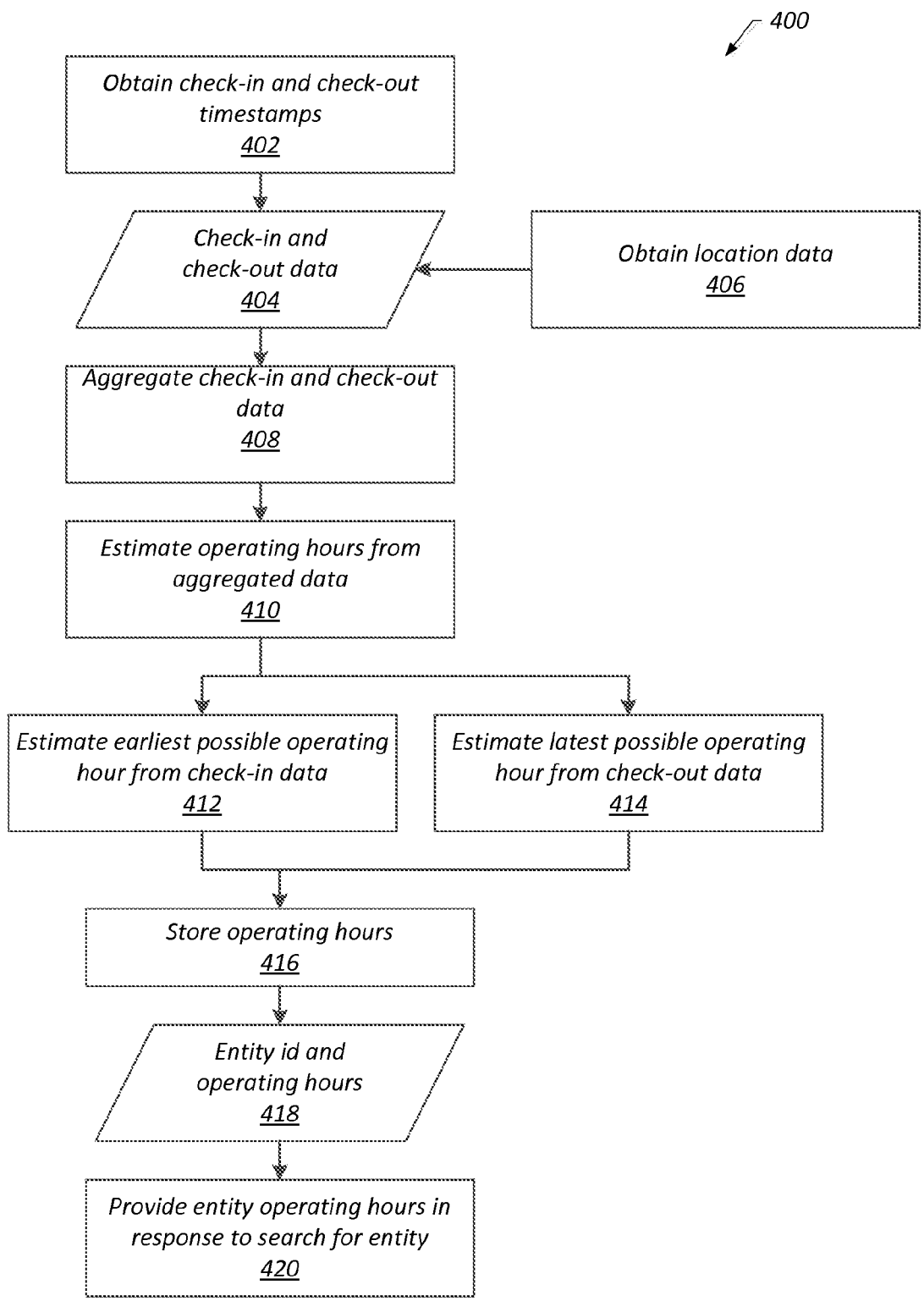
FIG. 4 is a block diagram of a process for determining the operating hours of an entity from check-in and check-out data in accordance with an embodiment of the present invention.

With the foregoing in mind, FIG. 4 depicts a process 400 for determining the operating hours of an entity from check-in and check-out data in accordance with an embodiment of the present invention. It should be appreciated that some or all steps of the process 400 may be implemented as executable code instructions stored on non-transitory tangible computer-readable media and executed by a processor (i.e., one or more processors). Initially, check-in and check-out data 404 may be obtained (block 402), such as by storing data received from a portable computer in the manner described above. The check-in and check-out data 404 may include for example, a timestamp of a check-in or check-out and an entity identifier corresponding to the entity for the check-in and check-out. Additionally, in other embodiments, location data (block 406) may be obtained, such as by receiving location data from a portable computer, so that the entity corresponding to a check-in or check-out may be determined from the location data.

Next, the check-in and check-out data for an entity may be aggregated (block 408) for a specific aggregation period. For example, the check-in and check-out data may be aggregated over a day of the week, multiple days of the week, etc. After aggregation, the operating hours for the entity may be estimated from the aggregated data (block 410). In such embodiments, the estimated operating hours may be assigned as the operating hours of the entity for the specific aggregation period (e.g., a specific day), or for a larger period (e.g., every weekday, every day of a week).

In some embodiments, the aggregated check-in data may be analyzed to estimate the earliest possible operating hour for an entity, i.e., the start time of the operating hours (block 412). In such embodiments, the start time may be determined by rounding down the earliest check-in timestamp to the nearest hour or half-hour. For example, if the earliest aggregated check-in timestamp for an entity is 11:10 am, the earliest possible start time for the operating hours of the entity may be determined to be 11:00 am. Similarly, the aggregated check-out data may be analyzed to determine the latest possible operating hour for an entity, i.e., the end time of the operating hours (block 414). In such embodiments, the end time may be determined by rounding up the latest check-out timestamp to the nearest hour or half-hour. For example, if the latest aggregated check-out timestamp is 6:55 pm, the latest possible end time for the operating hours of an entity may be determined to be 7:00 pm.

For example, Table 1 below depicts three check-ins and associated check-outs (expressed as a timestamp having a format of MM/DD/YYYY hh:mm:ss and 24-hour clock notation) that may be aggregated for a single day of Monday, Mar. 7, 2011, for an entity (identified by "XXXXX"):

TABLE 1

| Timestamp | Entity_id | Type |
| --- | --- | --- |
| 03/07/2011 11:10:02 | XXXXX | Check-in |
| 03/07/2011 11:35:10 | XXXXX | Check-out |
| 03/07/2011 14:00:05 | XXXXX | Check-in |
| 03/07/2011 14:10:30 | XXXXX | Check-out |
| 03/07/2011 17:20:20 | XXXXX | Check-in |
| 03/07/2011 18:10:44 | XXXXX | Check-out |

As shown above, the aggregated check-in and check-out data for Monday, Mar. 7, 2011, has an earliest check-in timestamp of 11:10 am. Thus, the earliest start time for the operating hours of the entity may be estimated to be 11:00 am. Similarly, the aggregated check-in and check-out data for Monday, Mar. 7, 2011, has a latest check-out timestamp of 18:10 (6:10 pm). Thus, the latest end time for the operating hours of the entity may be estimated to be 18:30 (6:30 pm).

In other embodiments, the check-in and check-out data may be aggregated over a different aggregation period for an entity, such as for a day of the week, as shown by the check-in and check-out data (expressed as a timestamp having a format of MM/DD/YYYY hh:mm:ss and 24-hour clock notation) depicted below in Table 2:

TABLE 2

| Timestamp | Entity ID | Type |
| --- | --- | --- |
| 03/07/2011 11:10:02 | XXXXX | Check-in |
| 03/07/2011 11:35:10 | XXXXX | Check-out |
| 03/14/2011 14:00:05 | XXXXX | Check-in |
| 03/14/2011 14:10:30 | XXXXX | Check-out |
| 03/14/2011 17:20:20 | XXXXX | Check-in |
| 03/14/2011 18:10:44 | XXXXX | Check-out |
| 03/21/2011 20:34:36 | XXXXX | Check-in |
| 03/21/2011 20:45:54 | XXXXX | Check-out |

As shown above, the check-in and check-out data may be aggregated for a Monday over multiple weeks in March of 2011, i.e., the weeks of March 6-March 12, March 13-March 19, and March 20-March 26. Based on the aggregated check-in and check-out data for these weeks, Monday, Mar. 7, 2011, has an earliest check-in timestamp of 11:10 am. Thus, the earliest possible start time for the entity for Monday may be estimated to be 11:00 am. Similarly, the aggregated check-in and check-out data over these weeks has a latest check-out timestamp of 20:45 (8:45 pm). Thus, the latest possible end time for the entity for Monday may be estimated to be 21:00 (9:00 pm). As noted above, the estimated operating hours may be assigned as the daily operating hours for that day of the week (e.g., Monday) or for a larger period (e.g., every weekday, every day of the week, etc.).

After estimating the operating hours for an entity, the operating hours may be stored, such as in the database 306 described above. In some embodiments, the operating hours and an entity identifier (block 418) may be stored. The operating hours may then be provided as the operating hours for the entity in response to various requests. For example, in some embodiments, the operating hours for an entity may be provided in response to a search for the entity (block 420), such as a search received from a web-based search engine or through an interactive map. In other embodiments, the operating hours may be listed on a webpage, such as a directory listing or web portal for a geographic region.

Figure 5:
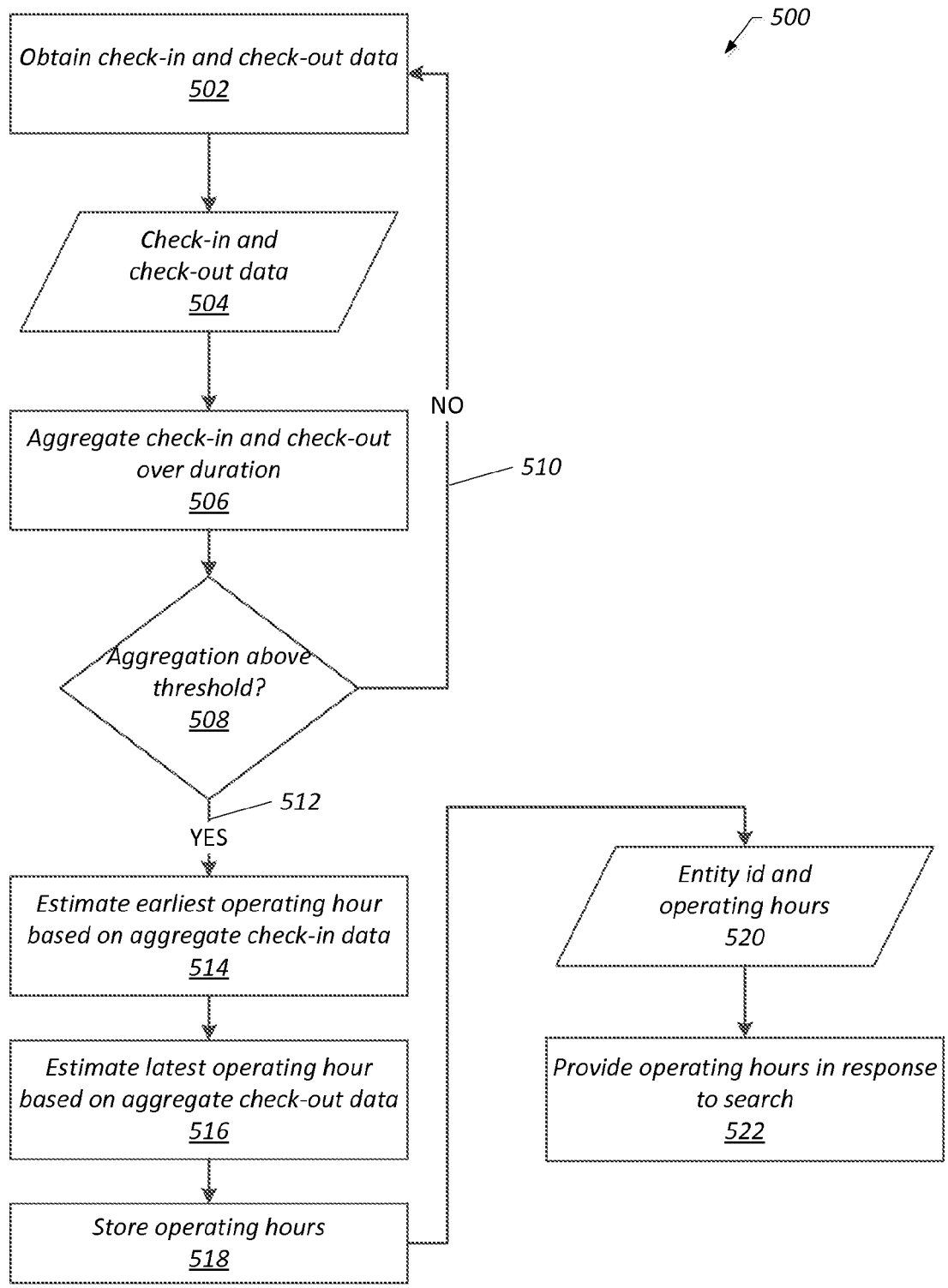
FIG. 5 is a block diagram of a process for determining the operating hours of an entity from check-in and check-out data for an aggregation period in accordance with an embodiment of the present invention.

FIG. 5 depicts a process 500 for determining the operating hours of an entity for an aggregation period in accordance with an embodiment of the present invention. It should be appreciated that some or all steps of the process 500 may be implemented as executable code instructions stored on non-transitory tangible computer-readable media and executed by a processor (i.e., one or more processors). Initially, as described above, check-in and check-out data may be obtained (block 502), such as from multiple portable computers in the manner described above. The check-in and check-out data 504 may include, for example, a timestamp for a check-in or check-out and an entity identifier.

Next, the check-in and check-out data may be aggregated for an entity over an aggregation period (block 506). For example, the aggregation period may be one day, multiple days, one week, multiple weeks, one year, etc. The aggregation may be compared to a threshold (decision block 508) to determine if enough check-in and check-out data is obtained to provide an estimation of the operating hours of an entity. For example, the number of aggregated check-in and/or check-out records may be compared to a threshold. In other embodiments, the threshold may be a duration of time, such as a number of hours, a number of days, a number of weeks, a number of years, etc. The duration of time spanned by the check-in and check-out records may be determined and compared to a threshold, such as the duration between the first check-in record and the last check-in record, the first check-out record and the last check-out record, or any combination thereof.

If the aggregation is not above the threshold (line 510), then additional check-in and check-out data may be obtained (block 502) and aggregated (block 506) until the aggregation is sufficient for the threshold. If the aggregation is above the threshold (line 512), then the operating hours for the entity may be estimated from the check-in and check-out data. As described above, the earliest possible start time for the operating hours of the entity for the aggregation period may be estimated from the aggregated check-ins (block 514). Additionally, the latest possible end time for the operating hours of entity for the aggregation period may be estimated from the aggregated check-outs (block 516). The estimated operating hours may be stored (block 518), such as in a database. The stored data may include the estimated operating hours and an entity identifier associated with the operating hours (block 520). Additionally, as also noted above, the stored operating hours may be provided in response to a search for the entity (block 522), such as from a web-based search engine or an interactive map.

Figure 6:
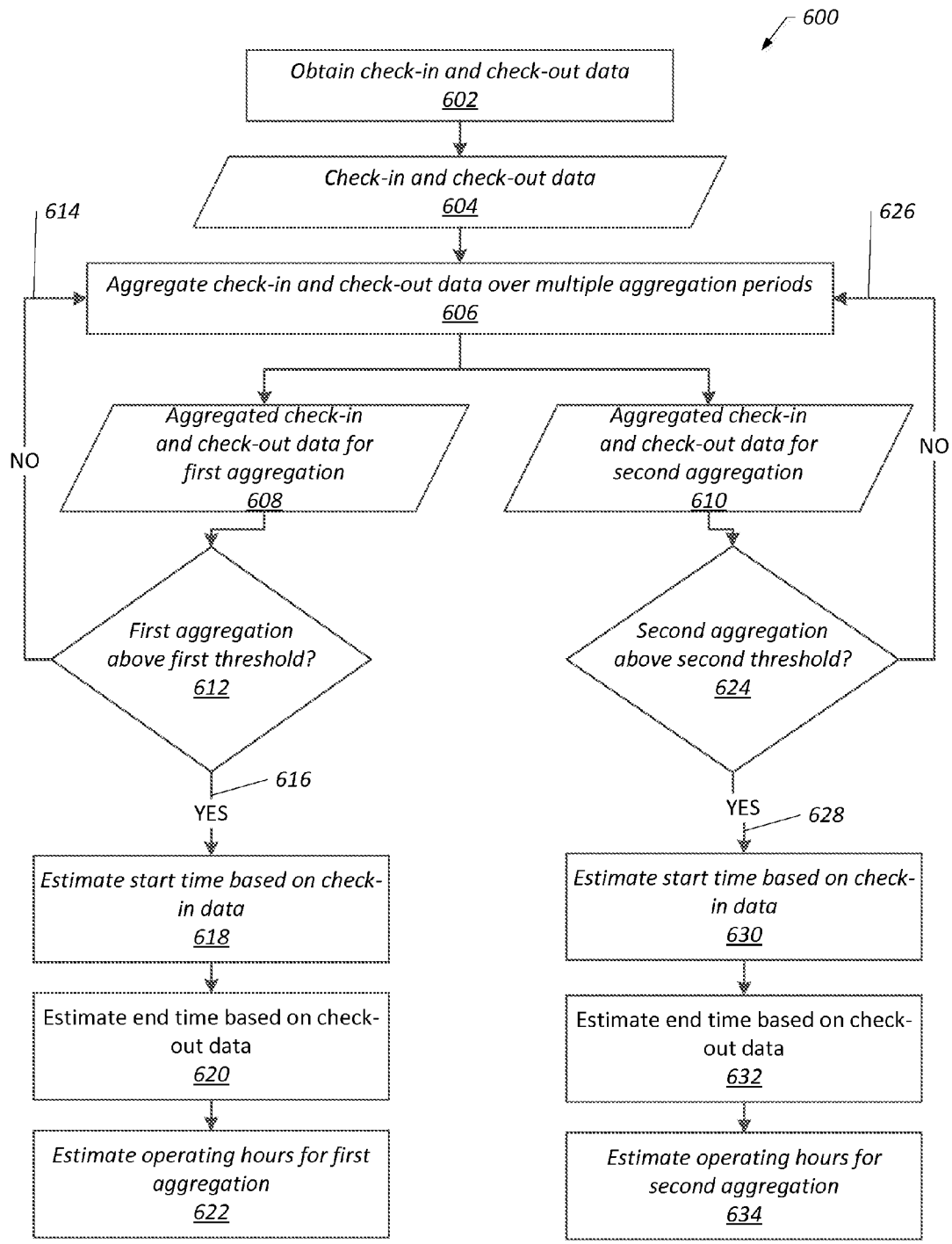
FIG. 6 is a block diagram of a process for estimating operating hours of an entity for multiple aggregation periods in accordance with an embodiment of the present invention.

The operating hours for an entity may be estimated for multiple aggregation periods, such as specific days of a week, specific weeks of year, etc. FIG. 6 depicts a process 600 for estimating operating hours of an entity for two aggregation periods in accordance with an embodiment of the present invention. It should be appreciated that some or all steps of the process 600 may be implemented as executable code instructions stored on non-transitory tangible computer-readable media and executed by a processor (i.e., one or more processors). Initially, check-in and check-out data may be obtained (block 602), such as in the manner described in FIGS. 1 and 2. The check-in and check-out data (block 604) may include check-in and check-in outs for multiple days of the week, e.g., Monday, Tuesday, Wednesday, Thursday, Friday, Saturday, and Sunday.

Next, the check-in and check-out data may be aggregated for an entity over multiple aggregation periods (block 606), such as a first aggregation period and a second aggregation period. The aggregation periods may be selected based on those periods expected to have different operating hours. For example, the check-in and check-out data may be aggregated for a first aggregation period (block 608) of Monday-Thursday and a second aggregation period (block 610) of Friday. In other embodiments, the check-in and check-out data may be aggregated for a first aggregation period of weekdays (i.e., Monday, Tuesday, Wednesday, Thursday, Friday) and a second aggregation period of weekends (i.e., Saturday and Sunday). In yet other embodiments, the check-in and check-out data may be aggregated over specific weeks of a year, such as every week of a holiday shopping season (e.g., the weeks between Thanksgiving and Christmas day).

After aggregating the check-in and check-out data over a first aggregation period, the first aggregation may be compared to a threshold (block 612). For example, as described above, the number of aggregated check-in and/or check-out records may be compared to a threshold, such as a number of check-in and check-out records. If the aggregation is not above the threshold (line 614), then more check-in and check-out data may be obtained (block 602) and aggregated (block 606). If the aggregation is above the threshold (line 616), then the operating hours for the first aggregation period may be estimated from the check-in and check-out data. As described above, the earliest start time for the operating hours may be estimated from the aggregated check-ins (block 618) and the latest end time of the operating hours may be estimated from the aggregated check-outs (block 620). The earliest start time and latest end time may provide the operating hours for the first aggregation period (e.g., Monday-Thursday) for the entity (block 622)

The processing for the second aggregation period may be performed in a similar manner. After aggregating the check-in and check-out data over a second aggregation period, the second aggregation may be compared to a threshold (block 624), such as by comparing the number of aggregated records to a number of check-in and check-out records. If the aggregation is not above the threshold (line 626), then more check-in and check-out data may be obtained (block 602) and aggregated (block 606). If the aggregation is above the threshold (line 628), then the operating hours for the second aggregation period may be estimated from the check-in and check-out data. As described above, the earliest start time for the operating hours may be estimated from the aggregated check-ins (block 630) and the latest end time for the operating hours may be estimated from the aggregated check-outs (block 632). The estimation may provide the operating hours for the second aggregation period (e.g., Friday, weekends, etc.) for the entity.

For example, Table 3 below depicts five check-ins and associated check-outs (expressed as timestamps having a format of MM/DD/YYYY hh:mm:ss and 24-hour clock notation) for an entity that may be aggregated over multiple aggregation periods:

TABLE 3

| Timestamp | Entity ID | Type |
|---|---|---|
| 03/07/2011 11:10:02 | XXXXX | Check-in |
| 03/07/2011 11:35:10 | XXXXX | Check-out |
| 03/08/2011 14:00:05 | XXXXX | Check-in |
| 03/08/2011 14:10:30 | XXXXX | Check-out |
| 03/08/2011 17:20:20 | XXXXX | Check-in |
| 03/08/2011 18:10:44 | XXXXX | Check-out |
| 03/11/2011 10:32:27 | XXXXX | Check-in |
| 03/11/2011 10:41:38 | XXXXX | Check-out |
| 03/11/2011 20:34:36 | XXXXX | Check-in |
| 03/11/2011 20:45:54 | XXXXX | Check-out |

As shown above, the check-in and check-out data includes data for Monday, March 7, Tuesday, March 8, and Friday, March 11. The check-in out and check-out data may be aggregated for a first aggregation period, such as Monday-Thursday, and a second aggregation period, such as Friday. For example, the check-in and check-out data for the first aggregation period of Monday-Thursday has an earliest check-in timestamp of 11:10 am on Monday, March 7. Thus, the earliest possible start time for the operating hours of the entity for the first aggregation period of Monday-Thursday may be estimated to be 11:00 am. Similarly, the check-in and check-out data for the first aggregation period of Monday-Thursday has a latest check-out timestamp of 18:10 (6:10 pm) on Tuesday, March 8. Accordingly, the latest possible end time for operating hours of the entity for the first aggregation period of Monday-Thursday may be estimated to be 6:30 pm. For the second aggregation period of Friday, the check-in and check-out data has an earliest start time of 10:32 am on Friday, March 11. Thus, the earliest possible start time for the operating hours for the second aggregation period may be estimated to be 10:00 am. Similarly, the check-in and check-out data for the second aggregation period of Friday has a latest check-out timestamp of 20:45 (8:45 pm) on Friday, March 11.

Accordingly, the earliest possible start time for the operating hours for the second aggregation period of Friday may be estimated to be 9:00 pm.

Figure 7:
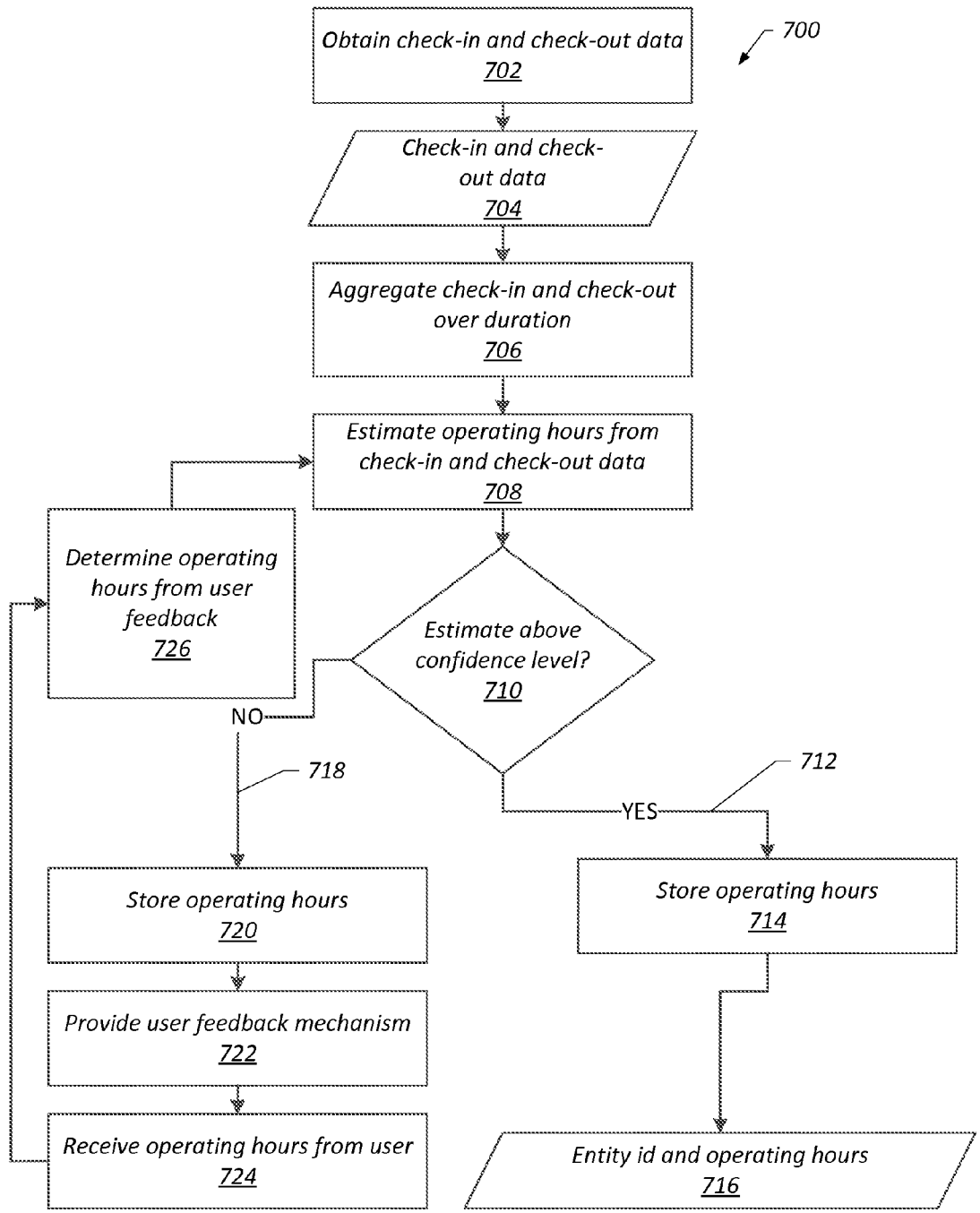
FIG. 7 is a block diagram of a process for estimating operating hours of an entity in accordance with an embodiment of the present invention.

In other embodiments, additional analysis may be performed on the estimation of operating hours of an entity from check-in and check-out data. FIG. 7 depicts a process 700 for determining operating hours of an entity in accordance with another embodiment of the present invention. It should be appreciated that some or all steps of the process 700 may be implemented as executable code instructions stored on non-transitory tangible computer-readable media and executed by a processor (i.e., one or more processors). Initially, as described above, check-in and check-out data may be obtained (block 702), such as in the manner described above in FIGS. 1 and 2. The check-in and check-out data 704 may include for example, a timestamp for a check-in or check-out and an entity identifier. Next, the check-in and check-out data may be aggregated over a duration of time (block 706). For example, the duration may be one day, multiple days, one week, multiple weeks, one year, etc.

As described above, operating hours for an entity, such as a start time and end time, may be estimated from the check-in and check-out data (block 708). In some embodiments, the estimation may include the application of statistical analysis techniques. In such embodiments, the estimate may be compared to a confidence level (decision block 710). If the estimate is above the confidence level (line 712), the operating hours for the entity may be stored (block 714), such as in a database storing an entity identifier and operating hours (block 716).

If the estimate is below the confidence level (line 718), the operating hours may be stored (block 720) and additional steps may be performed to improve the estimation. For example, in some embodiments, the process 700 may receive feedback from multiple users (e.g., "crowdsourcing") to improve the estimation of operating hours for an entity. In some embodiments, a user feedback mechanism may be provided (block 722). For example, in some embodiments, a search result provided in response to a search for an entity may include a link for a user to input operating hours (e.g., to input a start time and/or end time of the operating hours). In other embodiments, the user feedback mechanism may be provided in other contexts or applications, such as interactive map, a listing of entities, etc. In yet other embodiments, the user feedback mechanism may be provided in response to a user's check-in or check-out at an entity, such as in the application providing the check-in and check-out functionality.

After providing a user feedback mechanism, operating hours (e.g., a start time and/or end time) may be received from one or more users (block 724). The operating hours received from users may be stored and analyzed in a manner similar to the check-in and check-out data described above. Accordingly, operating hours may be determined from the user feedback (block 726), such as by determining the start time and the end time of the operating hours from the user feedback data. These estimates may then be used to modify the estimation of operating hours from the check-in and check-out data (block 708). The improved estimate may then be compared to the confidence level (decision block 710) and the process 700 may continue in the manner described above.

Figure 8:
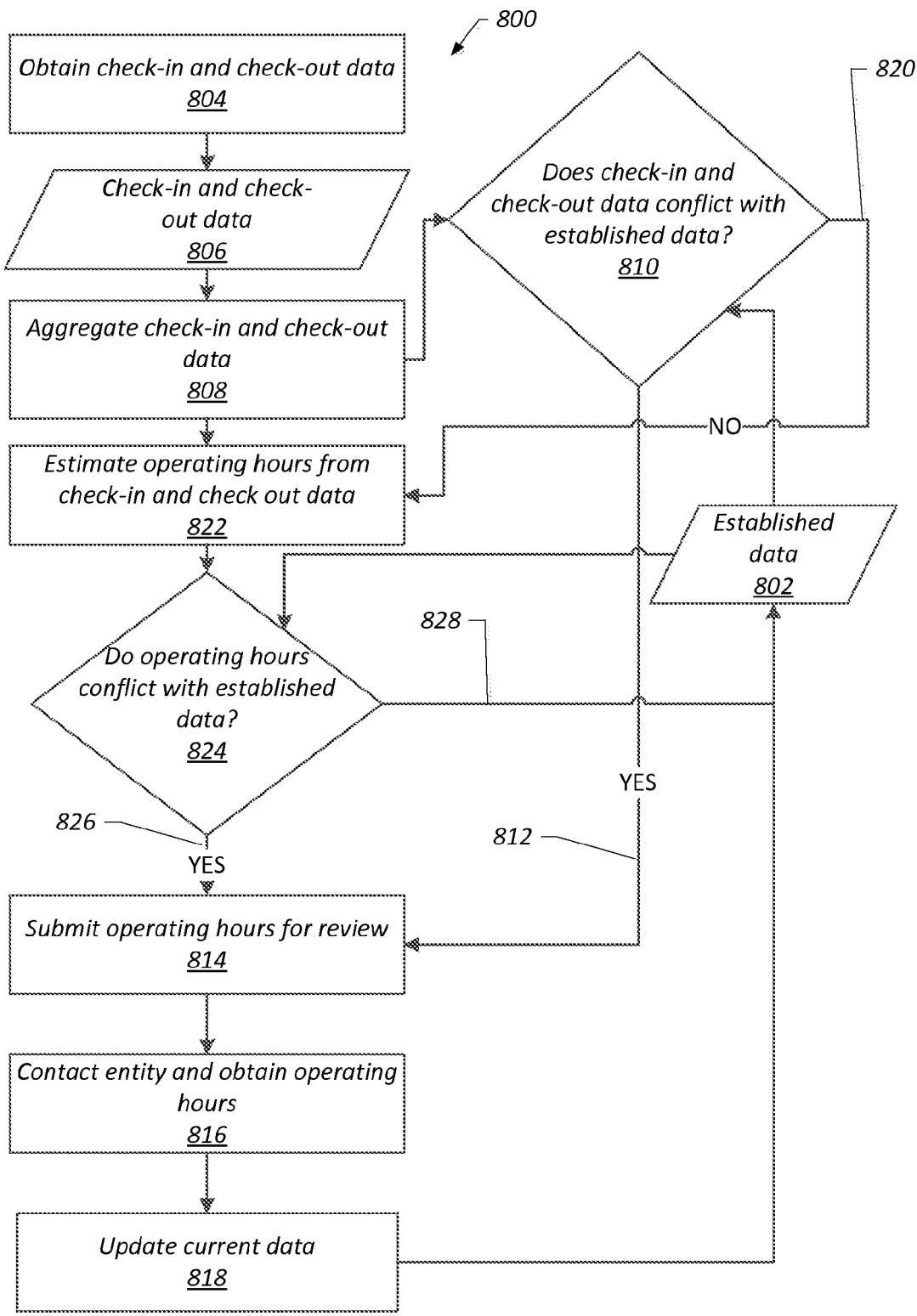
FIG. 8 is a block diagram of a process for estimating operating hours from check-in and check-out data and comparing the estimated operating hours to established data in accordance with an embodiment of the present invention.

In other embodiments, the operating hours estimated from check-in and check-out data may be compared to operating hours previously obtained by other techniques, such as operating hours obtained directly from an entity. FIG. 8 illustrates a process 800 for estimating operating hours from check-in and check-out data and comparing the estimated operating hours to established data for an entity. It should be appreciated that some or all steps of the process 800 may be implemented as executable code instructions stored on non-transitory tangible computer-readable media and executed by a processor (i.e., one or more processors). In some embodiments, the established data 802 for an entity may be obtained by contacting an entity (e.g., via telephone or email) to obtain the operating hours of the entity, by retrieving the operating hours from a listing service (e.g., Yellow Pages), or by other techniques for obtaining the data directly from the entity or from another source.

As described above, check-in and check-out data may be obtained (block 804) for the entity in the manner described above in FIGS. 1 and 2. The check-in and check-out data 806 may include, for example, a timestamp of the check-in or check-out and an entity identifier corresponding to the entity for the check-in and check-out. Next, the check-in and check-out data may be aggregated over a duration of time (block 808) and for a specific aggregation period, as described above.

In some embodiments, the aggregated check-in and check-out data may be compared to the established data to determine if the check-in and check-out data conflicts with the established data for an entity (decision block 810). In such embodiments, the aggregated check-ins and check-outs for an aggregation period may be compared to the established operating hours for an entity to determine if the check-ins and check-outs are outside of the established operating hours for that aggregation period. For example, if the established operating hours for an aggregation period include an earliest start time of 9:00 am, and the aggregated check-in data includes check-ins of 8:35 am and 8:40 am, a conflict between the established data and check-in data may be identified. Similarly, if the established operating hours for an aggregation period include a latest end time of 6:30 pm, and the aggregated check-out data includes check-outs of 7:00 pm and 7:15 pm, a conflict between the established data and check-out data may be identified.

If a conflict between the check-in and check-out data and the established data is determined (line 812), the operating hours of the established data may be submitted for review (block 814). Such review may include contacting the entity (e.g., via telephone or email) and obtaining updated operating hours (block 816). In other embodiments, the review may include reviewing the established data for data entry errors or other errors. The established data 802 may be updated (block 818) with the updated operating hours obtained from the entity.

If the check-in and check-out data does not conflict with the established data (line 820), the operating hours for the entity may be estimated from the check-in and check-out data (block 822). In some embodiments, the estimated operating hours may also be compared to the established data 802 to determine if the estimated operating hours conflict with the operating hours of the established data (decision block 824). If the estimated operating hours conflict with the established data (line 826), then the established data may be submitted for review (block 814) and the entity may be contacted (e.g., via telephone or email) to obtain the operating hours (block 816). The established data for the entity may then be updated (block 818), as described above. If the estimated operating hours do not conflict with the established data (line 828), then the estimated operating hours may be added to the established data 802. For example, if the established data 802 does not include operating hours for a specific aggregation period, the operating hours for that aggregation period may be added to the established data for the entity.

Figure 9:
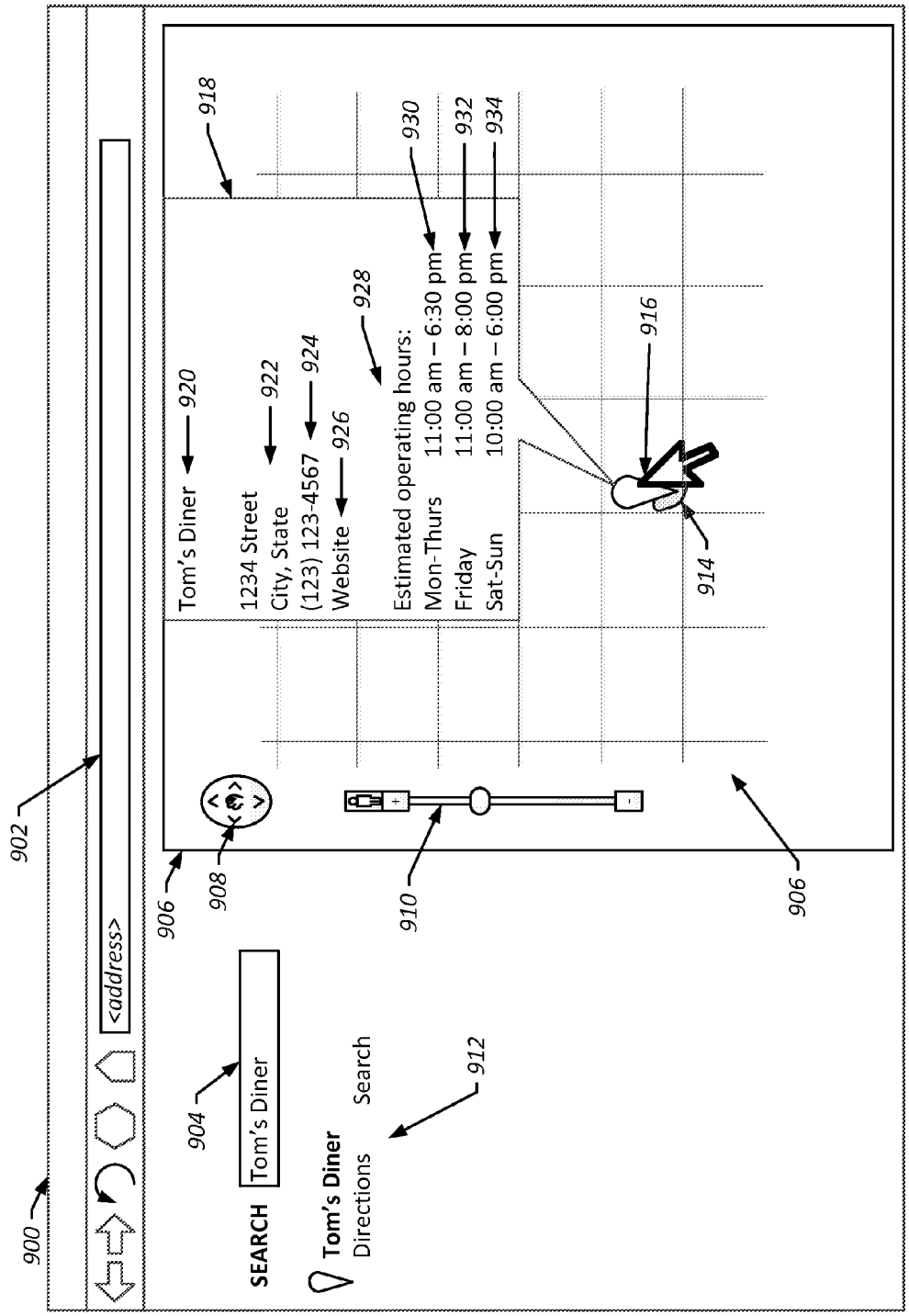
FIG. 9 is a schematic of a screenshot illustrating the display of estimated operating hours in accordance with an embodiment of the present invention.

FIG. 9 depicts a screenshot 900 illustrating the display of estimated operating hours in accordance with an embodiment of the present invention. The illustrated screenshot 900 may be from a display on a computer, such as the portable computer described above. The illustrated screenshot 900 and displayed information may be displayed by an application executed on the computer, such as a browser (e.g., Google Chrome™) displaying a web application. In other embodiments, the information depicted in screenshot 900 may be displayed by an interactive map application executing on a portable computer (e.g., Google Maps™).

The screenshot 900 depicts an address field 902 (e.g., an address field of a browser), a search field 904 (e.g., a search field of an application), and an interactive map 906. The interactive map 906 may include a pan button 908 that enables a user to pan the interactive map 906 and a zoom slider 910 that enables a user to zoom in and zoom out of the interactive map 906. In some embodiments, a user may search for an entity (e.g., "Tom's Diner") by entering the entity's name in the search field 904. The search request may be transmitted over a network and search results 912 may be displayed that include information about the entity, such as a link (e.g., "Directions") to directions to the entity. Additionally, the location 914 of the entity may be displayed on the interactive map 906, such as by the display of an icon 916.

As shown in FIG. 9, a user may be able to view information about the entity by clicking on the icon 916. In response, a window 918 may be displayed having information about the entity. For example, the window 918 may display the name 920 of the entity (e.g., "Tom's Diner"), the address 922 of the entity (e.g., "1234 Street . . . "), the telephone number 924 of the entity (e.g., "(123) 123-4567"), and the website 926 for the entity. Additionally, the window 918 may display the estimated operating hours 928 of the entity as determined by the techniques described above. The estimated operating hours 928 may be determined for multiple aggregation periods, as described above, and displayed accordingly. For example, as shown in FIG. 9, the estimated operating hours for a first aggregation period 930 (e.g., Monday-Thursday), a second aggregation period 932 (e.g., Friday), and a third aggregation period 934 (e.g., Saturday and Sunday) may be displayed in the window 918.

Figure 10A:
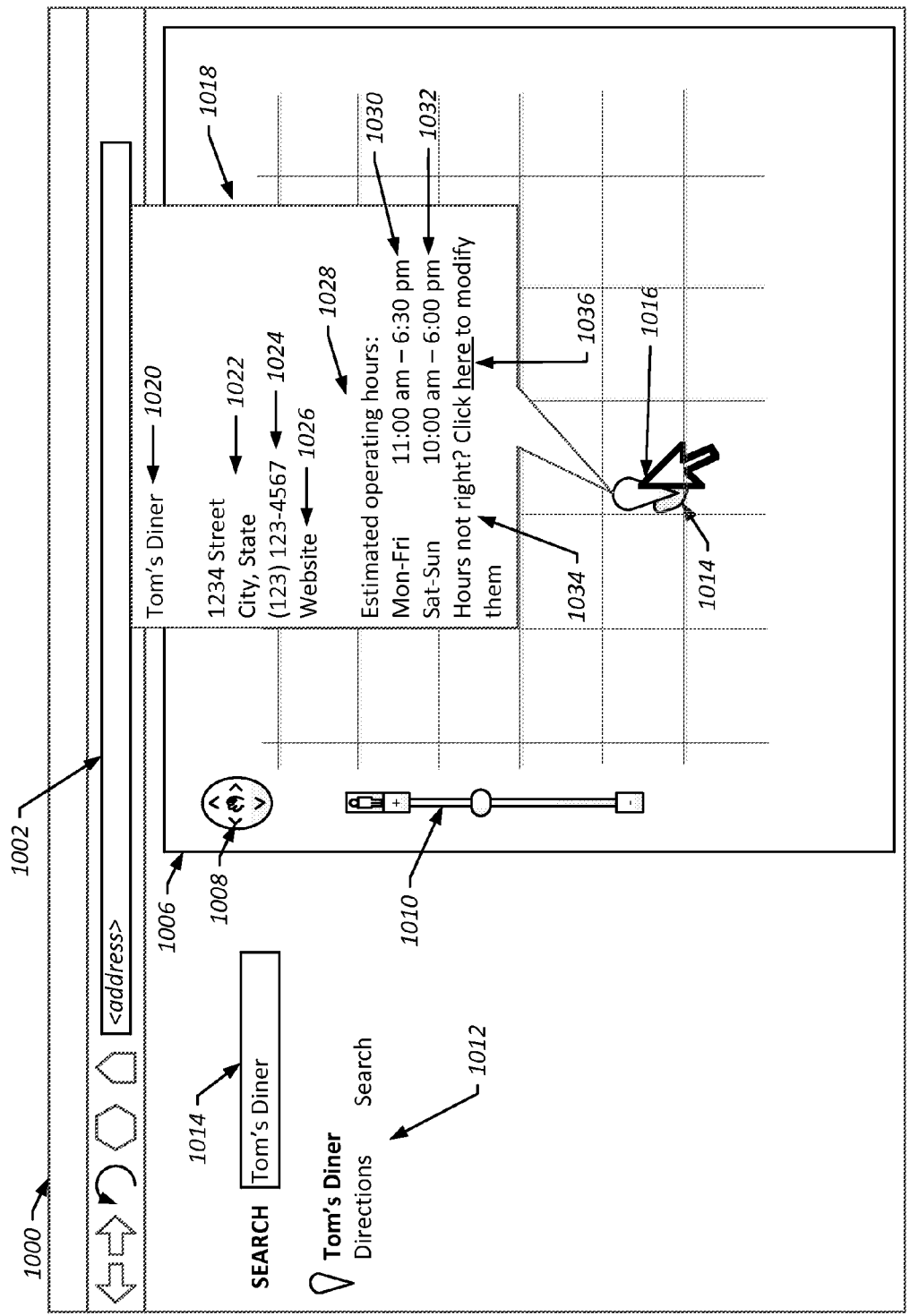
FIGS. 10A and 10B are schematics of screenshots illustrating the display of estimated operating hour in accordance with an embodiment of the present invention.

FIG. 10A depicts a screenshot 1000 illustrating the display of estimated operating hours in accordance with an embodiment of the present invention. As described above, the illustrated screenshot 1000 may be from a display on a computer, such as the portable computer described above. The illustrated screenshot 1000 and displayed information may be displayed by an application executed on the computer, such as a browser (e.g., Google Chrome, Mozilla Firefox, Internet Explorer) displaying a web application. In other embodiments, the information depicted in screenshot 1000 may be displayed by an interactive map application executing on a portable computer (e.g., Google Maps).

The screenshot 1000 depicts an address field 1002 (e.g., an address field of a browser) a search field 1004 (e.g., a search field of an application) and an interactive map 1006. Similar to the embodiments described above in FIG. 9, the interactive map 1006 may include, for example, a pan button 1008 that enables a user to pan the interactive map 1006 and a zoom slider 1010 that enables a user to zoom in and zoom out of the interactive map 1006. In some embodiments, a user may search for an entity (e.g., "Tom's Diner") in the manner described above in FIG. 9, such that search results 1012 having information about the entity may be displayed. Additionally, the location 1014 of the entity may be displayed on the interactive map 1006, such as by the display of an icon 1016.

As shown in FIG. 10A, a user may be able to view information about the entity by clicking on the icon 1016. In response, a window 1018 may be displayed having information about the entity, such as the name 1020 of the entity (e.g., "Tom's Diner"), the address 1022 of the entity (e.g., "1234 Street . . . "), the telephone number 1024 of the entity (e.g., "(123) 123-4567"), and the website 1026 for the entity. Additionally, the window 1018 may display the estimated operating hours 1028 of the entity as determined by the techniques described above. In some embodiments, the estimated operating hours 1028 may be determined for multiple aggregation periods, as described above, and displayed accordingly. For example, as shown in FIG. 10A, the estimated operating hours for a first aggregation period 1030 (e.g., Monday-Friday) and a second aggregation period 1032 (e.g., Saturday and Sunday) may be displayed.

Additionally, as shown in FIG. 10A, the window 1018 may display a prompt 1034 for user feedback (e.g., "Hours not right? Click here to modify them"). As described above in FIG. 7, a user feedback mechanism may be used to improve the estimation of operating hours from aggregated check-in and check-out data. The prompt 1034 may include, for example, a link 1036 to enable a user to manually input the operating hours for the entity upon selecting (e.g., clicking) the link 1036, as shown in the screenshot depicted in FIG. 10B.

Figure 10B:
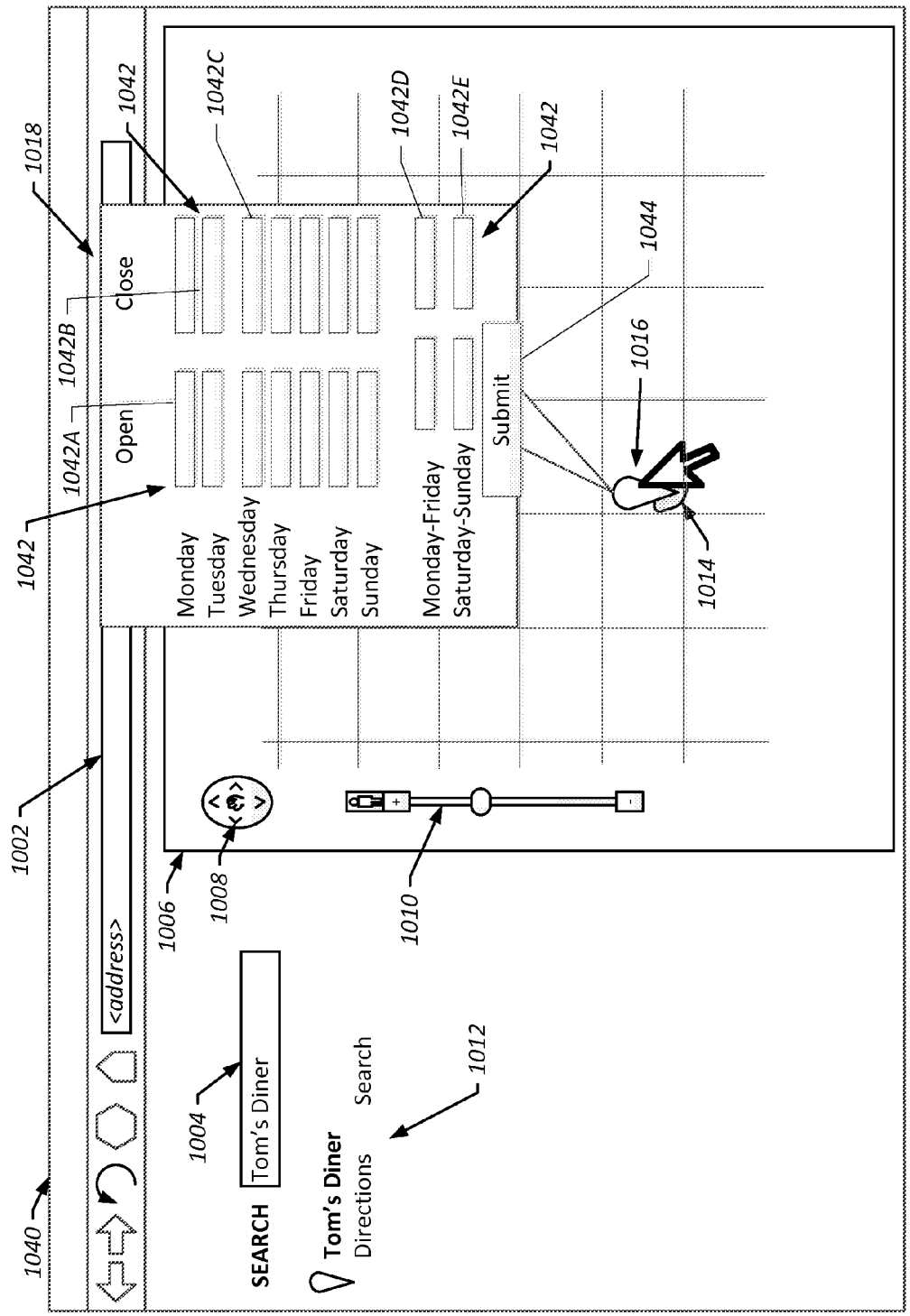

FIG. 10B depicts a screenshot 1040 illustrating user feedback of operating hours in accordance with an embodiment of the present invention. Once a user selects the link 1036, the window 1018 may display a number of text entry fields 1042 to enable a user to manually input the operating hours for a day or a specific aggregation period. Two columns of text entry fields 1042 may be displayed for the earliest operating hour (i.e., "Open") and the latest operating hour (i.e., "Close") respectively. In some embodiments, text entry fields for each day may be displayed, such as text entry fields 1042A for Monday, text entry fields 1042B for Tuesday, text entry fields 1042C for Wednesday, and so on. Additionally, or alternatively, text entry fields for different aggregation periods may displayed, such as 1042D for a first aggregation period (e.g., Monday-Friday) and 1042E for a second aggregation period (e.g., Saturday and Sunday). For example, a user may enter a start time in the "Open" text entry field and an end time in the "Close" text entry field for a day or other aggregation periods. After inputting the operating hours into one or more of the text entry fields 1042, a user may select (e.g., click) a submit button 1044 to transmit the manually entered operating hours for further processing, such as described above in FIG. 7.

Figure 11:
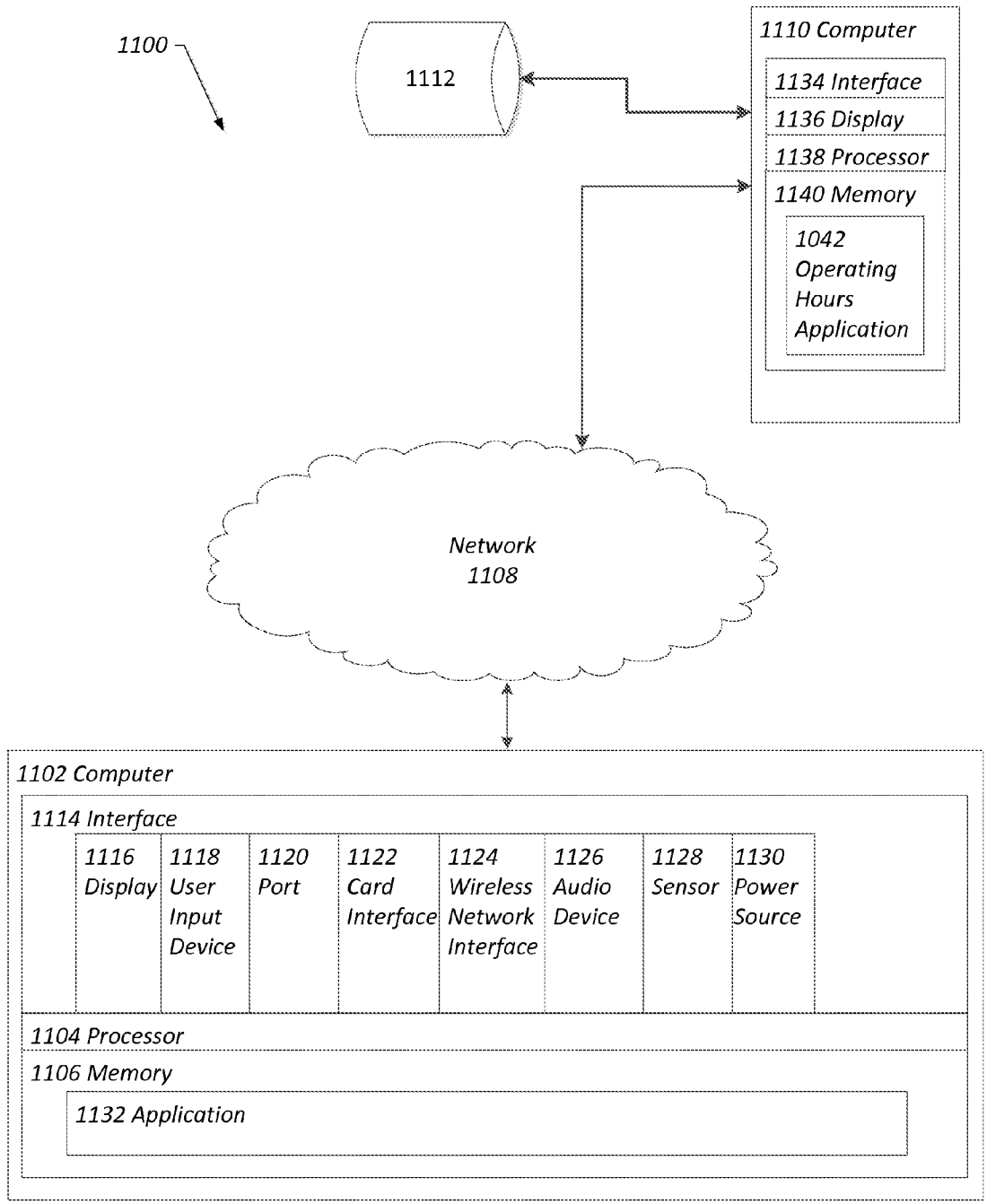
FIG. 11 is a block diagram of a system for estimating operating hours of an entity in accordance with an embodiment of the present invention.

With these foregoing techniques in mind, a general description of an exemplary system for performing these techniques is described below. FIG. 11 is a block diagram of a system 1100 having various components that may be present in computers suitable for use with the present techniques. These types of computers, and other computers providing comparable capabilities, may be used in conjunction with the present techniques. The system 1100 may include a computer 1102, e.g., a portable computer such as a smartphone, tablet computer, laptop computer, etc., having a processor 1104 and memory 1106. The computer 1102 may communicate over a network 1108. Additionally, the system 1100 may include other computers, e.g., computer 1110, also in communication with the network 1108. Thus, the computer 1102 and the computer 1110 may communicate with each other over the network 1108. The system 1100 may include a database 1112 accessible by the computer 1110. The database may be a part of the computer 1110 or may be implemented in separate computer or multiple computers.

The computer 1102 may include various internal and external components that contribute to the function of the device and which may allow the computer 1102 to function in accordance with the techniques discussed herein. As will be appreciated, various components of computer 1102 may be provided as internal or integral components of the computer 1102 or may be provided as external or connectable components. It should further be noted that FIG. 11 depicts merely one example of a particular implementation and is intended to illustrate the types of components and/or functionalities that may be present in computer 1102.

In various embodiments, the computer 1102 may be a media player, a smartphone, a tablet computer, a personal data organizer, an e-book reader (e-reader), a vehicle navigation system, or the like. The computer 1102 may be a unified device providing any one of or a combination of the functionality of a media player, a cellular phone, a personal data organizer, and so forth. In addition, the computer 1102 may allow a user to connect to and communicate through the network 1108 (e.g., the Internet, a local area network, a wide area network, etc.), and may provide communication over a satellite-based navigation system, such as for a global positioning system. For example, the computer 1102 may allow a user to communicate using email, text messaging, instant messaging, or using other forms of electronic communication, and may allow a user to view the location of the device, such as on an interactive map. As mentioned above, the computer 1102 may include the processor 1104 and the memory 1106. Additionally, the computer 1102 may include, for example, an interface 1114, a display 1116, an input device 1118, an input/output port 1120, a card interface 1122, a wireless network interface 1124, an audio device 1126, a sensor 1128, and a power source 1130.

In one embodiment, the display 1116 may include a liquid crystal display (LCD) or an organic light emitting diode (OLED) display, although other display technologies may be used in other embodiments. The display 1116 may display a user interface (e.g., a graphical user interface). The display 1116 may also display various function and/or system indicators to provide feedback to a user, such as power status, call status, memory status, etc. These indicators may be in incorporated into the user interface displayed on the display 1116. In accordance with some embodiments, the display 1116 may include or be provided in conjunction with touch sensitive elements through which a user may interact with the user interface. Such a touch-sensitive display may be referred to as a "touch screen" and may also be known as or called a touch-sensitive display system.

The processor 1104 may provide the processing capability required to execute the operating system, programs, user interface, and any functions of the computer 1102. The processor 1104 may include one or more microprocessors, such as one or more "general-purpose" microprocessors, a combination of general and special purpose microprocessors, and/or ASIC. For example, the processor 1104 may include one or more reduced instruction set (RISC) processors, such as those implementing the Advanced RISC Machine (ARM) instruction set. Additionally, the processor 1104 may include single-core processors and multicore processors and may include graphics processors, video processors, and/or related chip sets.

The memory 1106 (which may include tangible non-transitory computer readable storage mediums) may include volatile memory and non-volatile memory accessible by the processor 1104 and other components of the computer 1102. The memory 1106 may store a variety of information and may be used for a variety of purposes. For example, the memory 1106 may store the firmware for the computer 1102, an operating system for the computer 1102, and any other programs or executable code necessary for the computer 1102 to function. In addition, the memory 1106 may be used for buffering or caching during operation of the computer 1102.

As mentioned above, the memory 1106 may include volatile memory, such as random access memory (RAM). The memory 1106 may also include non-volatile memory, such as ROM, flash memory, a hard drive, any other suitable optical, magnetic, or solid-state storage medium, or a combination thereof. The memory 1106 may store data files such as media (e.g., music and video files), software (e.g., for implementing functions on computer 1102), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

The interface 1114 may include multiple interfaces and may couple various components of the computer 1102 to the processor 1104 and memory 1106. In some embodiments, the interface 1112, the processor 1104, memory 1106, and one or more other components of the computer 1102 may be implemented on a single chip, such as a system-on-a-chip (SOC). In other embodiments, these components and/or their functionalities may be implemented on separate chips.

The computer 1102 also includes a user input device 1118 configured to control the computer 1102, such as by controlling a mode of operation, an output level, an output type, etc. For instance, the user input device 1118 may include a button to turn the computer 1102 on or off. Embodiments of the computer 1102 may include any number of user input devices 1118, including buttons, switches, a control pad, keys, knobs, a scroll wheel, or any other suitable input structures. The input device 1118 may work with a user interface displayed on the computer 1102 to control functions of the computer 1102 or of other devices connected to or used by the computer 1102. For example, the input device 1118 may allow a user to navigate a displayed user interface or to return such a displayed user interface to a default or home screen.

The computer 1102 may also include an input and output port 1120 to allow connection of additional devices. For example, the port 1120 may be a headphone jack that provides for connection of headphones. Additionally, the port 1120 may have both input/output capabilities to provide for connection of a headset (e.g. a headphone and microphone combination). Embodiments of the present invention may include any number of input and/or output ports 1120, including headphone and headset jacks, universal serial bus (USB) ports, Firewire or IEEE-1394 ports, and AC and/or DC power connectors. Further, the computer 1102 may use the input and output ports to connect to and send or receive data with any other device, such as other portable computers, personal computers, printers, etc. For example, in one embodiment the computer 1102 may connect to a personal computer via a USB connection to send and receive data files, such as applications, media files, etc.

The computer 1102 depicted in FIG. 11 also includes a card interface 1122. The card interface 1122 may receive expansion cards that may be used to add functionality to the computer 1102, such as additional memory, I/O functionality, or networking capability. The expansion card may connect to the computer 1102 through any type of connector and may be accessed internally or externally to the computer 1102. For example, in one embodiment the card may be a flash memory card, such as a SecureDigital (SD) card, mini- or microSD, CompactFlash card, Multimedia card (MMC), etc. Additionally, in some embodiments the card interface 1122 may receive a Subscriber Identity Module (SIM) card, for use with an embodiment of the computer 1102 that provides mobile phone capability, such as over the network 1108.

The computer 1102 depicted in FIG. 11 also includes a wireless network interface 1124, such as a network interface card (NIC), wireless (e.g., radio frequency) receivers, etc. For example, the wireless network interface 1124 having may receive and send electromagnetic signals and communicate with communications networks and other communications devices via the electromagnetic signals. The wireless network interface 1124 may include circuitry for performing these functions, including an antenna system, an RF transceiver, one or more amplifiers, a tuner, one or more oscillators, a digital signal processor, a CODEC chipset, a subscriber identity module (SIM) card, memory, and so forth. The wireless network interface 1124 may communicate with networks (e.g., network 1108), such as the Internet, an intranet, a cellular telephone network, a local area network (LAN), a wide area network (WAN), a metropolitan area network (MAN), or other networks, by wireless communication. The wireless communication may use any suitable communications standard, protocol and/or technology, including but not limited to Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable communication protocol.

The audio device 1126 provides an audio interface between a user and the computer 1102. In one embodiment, the audio device 1126 may include a speaker and may receive audio data, convert the audio data to an electrical signal, and transmit the electrical signal to the speaker. The audio device 1126 may also include a microphone and may receive electrical signals converted by the microphone from sound waves. The audio device 1126 may convert the electrical signal to audio data and transmits the audio data to the processor 1112 for processing. Audio data may also be retrieved from and transmitted to the memory 1114 and the wireless network interface 1124.

As shown in FIG. 11, the computer 1102 may also include a sensor 1128. The sensor 1128 may include a charge-coupled device (CCD) or complementary metal-oxide semiconductor (CMOS) phototransistors that, in conjunction with appropriate code executing on the processor 1112, may capture still images and/or video. The sensor 1128 may also include, for example, an accelerometer, such as for orientation, a magnetometer, and any other suitable type of sensor.

The computer 1102 may also include or be connected to a power source 1130. In one embodiment, the power source 1130 may be a battery, such as a Li-Ion battery. In such embodiments, the battery may be rechargeable, removable, and/or attached to other components of the computer 1102. Such battery-powered implementations may be highly portable, allowing a user to carry the computer 1102 while traveling, working, exercising, and so forth. In this manner, a user of the computer 1102, depending on the functionalities provided by the computer 1102, may listen to music, play games or video, record video or take pictures, place and take telephone calls, communicate with others, control other devices (e.g., the computer 1102 may include remote control and/or Bluetooth functionality, for example), and so forth while moving freely with the computer 1102. In addition, in certain embodiments the computer 1102 may be sized such that it fits relatively easily into a pocket or hand of the user (e.g., handheld). In such embodiments, the computer 1102 is relatively small and easily handled and utilized by its user and thus may be taken practically anywhere the user travels. Additionally, in certain embodiments the power source 1130 may be an external power source, such as a connection to AC power or DC power, and the computer 1102 may be connected to the power source 1130 via the input and output port 1120.

As mentioned above, the computer 1102 may execute various applications stored on the memory 1106 and executed on the processor 1104, such as an application 1132. The application 1132 may include a maps application that enables a user to view interactive maps of a geographic region and search for entities. Additionally, the application 1132 may enable a user to check-in at an entity to indicate the physical presence of the user at the entity and to check-out from an entity to indicate the physical absence of the user from the entity. As noted above, the check-in and check-out actions may be performed manually or automatically. For example, the application 1132 may automatically check-in the user, check-out the user, or both, based on a location received from the wireless network interface 1124. In some embodiments, the maps application may be Google Maps™ manufactured by Google, Inc., of Mountain View, Calif. In some embodiments, the check-in and check-out functionality may be provided by Google Latitude™ manufactured by Google, Inc., of Mountain View, Calif. In some embodiments, the application may include a web browser enabling a user to access a maps application via a website. In other embodiments, the application may include a standalone check-in and check-out application, i.e., an application having the check-in and check-out functionality described above but that does not include an interactive map. The check-ins and check-outs input to the computer 1102 may be stored, such as in the memory 1106, and may be transmitted over the network 1108. For example, the check-in and check-out actions may be transmitted from the computer 1102 over the network 1108 to the computer 1110, such as for storage in the database 1112.

In some embodiments, a user may search for an entity using the application 1132, such as by using a web-based search engine accessed from a web browser or by using a search feature in an interactive map application. As describe above, the user's search for an entity may return results having information about the entity that may include operating hours estimated in accordance with the techniques described above.

Turning now to the computer 1110 depicted in FIG. 11, the computer 1110 may also include various internal and external components that contribute to the function of the computers in accordance with the techniques discussed herein. As will be appreciated, various components of the computer 1110 may be provided as internal or integral components of the computer 1110 or may be provided as external or connectable components. It should further be noted that FIG. 11 depicts merely one example of a particular implementation and is intended to illustrate the types of components and/or functionalities that may be present in the computers 1110.

In various embodiments, the computer 1110 may be, for example, a laptop computer, a desktop computer, a server, a tablet computer, a workstation, or the like. In some embodiments, the computer 1110 may represent multiple computers housed in a data processing center or as multiple computers of a distributed computing network. In such embodiments, applications executed on the computer 1110 may be divided and executed on multiple computers in series or parallel.

The computer 1110 may include, for example, an interface 1134, a display 1136, a processor 1138, and a memory 1140. The interface 1134 may include multiple interfaces and may couple various components of the computer 1110 to the processor 1130 and memory 1140. The computer 1110 may include other components, such as though illustrated in the computer 1102. For example, the computer 1110 may include a network interface to enable communication over the network 1108.

The display 1136 may include a liquid crystal display (LCD) or an organic light emitting diode (OLED) display, although other display technologies may be used in other embodiments. The display 1136 may display user interfaces (e.g., a graphical user interface or command line interface). The display 1136 may also display various function and/or system indicators to provide feedback to a user, such as power status, memory status, etc. These indicators may be in incorporated into the user interface displayed on the display 1136. In accordance with some embodiments, the display 1136 may include or be provided in conjunction with touch sensitive elements through which a user may interact with the user interface. Such a touch-sensitive display may be referred to as a "touch screen" and may also be known as or called a touch-sensitive display system.

The processor 1138 may provide the processing capability required to execute the operating system, programs, user interface, and the respective computer 1110. The processor 1138 may include one or more microprocessors, such as one or more "general-purpose" microprocessors, a combination of general and special purpose microprocessors, and/or ASIC's. Additionally, the processor 1138 may include one or more reduced instruction set (RISC) processors, such as those implementing the Advanced RISC Machine (ARM) instruction set. The processor 1138 may also include single-core processors and multicore processors and may include graphics processors, video processors, and/or related chip sets.

The memory 1140 (which may include tangible non-transitory computer readable storage mediums) may include volatile memory and non-volatile memory accessible by the processor 1110 respectively and other components of the computer 1110. The memory 1140 may store a variety of information and may be used for a variety of purposes. For example, the memory 1140 may store the firmware for the computer 1110, operating systems for the computer 1110 and/or any other programs or executable code necessary for the computer 1110 to function. In addition, the memory 1114 may be used for buffering or caching during operation of the computer 1110.

As mentioned above, the memory 1140 may include volatile memory, such as random access memory (RAM). The memory 1140 may also include non-volatile memory, such as ROM, flash memory, a hard drive, any other suitable optical, magnetic, or solid-state storage medium, or a combination thereof. The memory 1140 may store data files such as media (e.g., music and video files), software (e.g., for implementing functions on computer 1110), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

As mentioned above, the computer 1110 may execute various applications stored on the memory 1140 and executed on the processor 1138, such as an operating hours application 1042. The operating hours application 1042 may obtain data from multiple computers and determine the operating hours of entities, such as in the manner described above and illustrated in FIGS. 4-8. For example, in some embodiments the database 1112 may store the check-in and check-out data described above and the computer 1110 may access such data for processing.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for determining the operating hours of an entity, comprising:
    obtaining, by one or more processors, a first plurality of timestamps, the first plurality of timestamps corresponding to the physical presence of a first plurality of users of a first plurality of portable computers at an entity having a location and operating hours, the operating hours having a start time and an end time;
    obtaining, by the one or more processors, a second plurality of timestamps corresponding to the physical absence of a second plurality of users of a second plurality of portable computers from the entity;
    aggregating, by the one or more processors, the first and second plurality of timestamps over at least two aggregation periods, the at least two aggregation periods being determined based at least in part on an expected difference in operating hours of the entity between the at least two aggregation periods;
    when the number of timestamps in the first plurality of timestamps is greater than a first threshold, determining, from the first plurality of timestamps and by the one or more processors, a first time for each of the at least two aggregation periods;
    when the number of timestamps in the second plurality of timestamps is greater than a second threshold, determining, from the second plurality of timestamps and by the one or more processors, a second time for each of the at least two aggregation periods; and
    determining, by the one or more processors, the start time and the end time of the operating hours of the entity for each of the at least two aggregation periods based at least in part on the first time and the second time for each of the at least two aggregation periods.

2. The computer-implemented method of claim 1, wherein determining, by the one or more processors, the start time and the end time comprises associating the start time and the end time with a unique identifier for the entity.

3. The computer-implemented method of claim 2, comprising storing the operating hours of the entity and the unique identifier in a memory coupled to the one or more processors.

4. The computer-implemented method of claim 1, comprising obtaining, by the one or more processors, a location associated with the first plurality of timestamps and the second plurality of timestamps.

5. The computer-implemented method of claim 1, comprising transmitting, over a network, the operating hours of the entity to a computer for display on a display device of the computer.

6. The computer-implemented method of claim 1, wherein each of the at least two aggregation periods comprises a day, a plurality of days, a week, or a plurality of weeks.

7. The computer-implemented method of claim 6, comprising determining the first time, from the first plurality of timestamps and by one or more processors, comprises selecting the earliest timestamp of the aggregated first plurality of time stamps for each of the at least two aggregation periods.

8. The computer-implemented method of claim 6, wherein determining the second time, from the second plurality of timestamps and by one or more processors, comprises selecting the latest timestamp of the aggregated second plurality of time stamps for each of the at least two aggregation periods.

9. A non-transitory tangible computer-readable storage medium having executable computer code stored thereon, the code comprising a set of instructions that, when executed by one or more processors, causes a computer to:
    obtain a first plurality of timestamps, the first plurality of timestamps corresponding to the physical presence of a first plurality of users of a first plurality of portable computers at an entity having a location and operating hours, the operating hours having a start time and an end time;
    obtain a second plurality of timestamps corresponding to the physical absence of a second plurality of users of a second plurality of portable computers from the entity;
    aggregate the first and second plurality of timestamps over at least two aggregation periods, the at least two aggregation periods being determined based at least in part on an expected difference in operating hours of the entity between the at least two aggregation periods;
    when the number of timestamps in the first plurality of timestamps is greater than a first threshold, determine, from the first plurality of timestamps, a first time for each of the at least two aggregation periods;
    when the number of timestamps in the second plurality of timestamps is greater than a second threshold, determine, from the second plurality of timestamps, a second time for each of the at least two aggregation periods; and
    determine the start time and the end time of the operating hours of the entity for each of the at least two aggregation periods based at least in part on the first time and the second time for each of the at least two aggregation periods.

10. The non-transitory computer-readable storage medium of claim 9, the computer code comprising a set of instructions that, when executed by a computer, causes the computer to store the operating hours of the entity and the unique identifier in a memory coupled to the one or more processors.

11. The non-transitory computer-readable storage medium of claim 9, the computer code comprising a set of instructions that, when executed by a computer, causes the computer to transmit, over a network coupled to the one or more processors, the operating hours of the entity to a computer for display on a display device of the computer.

12. A computer-implemented method for determining the operating hours of an entity, comprising:
    obtaining, by one or more processors, data indicative of a plurality of check-ins and check-outs at an entity having a location and operating hours;
    aggregating, by the one or more processors, the data over a first aggregation period and a second aggregation period, the first and second aggregation periods being determined based at least in part on an expected difference in operating hours of the entity during the first aggregation period relative to the second aggregation period;
    when the plurality of check-ins and check-outs at the entity are greater than a threshold, determining from the aggregated data, by the one or more processors, a first start time, a first end time, or both, for the first aggregation period from the aggregated data; and determining, by the one or more processors, the operating hours of the entity for the first aggregation period based at least in part on the first start time, the first end time, or both.

13. The computer-implemented method of claim 12, comprising determining from the aggregated data, by the one or more processors, a second start time, a second end time, or both, for the second aggregation period.

14. The computer-implemented method of claim 13, comprising determining the operating hours of the entity for the second aggregation period based at least in part on the second start time, the second end time, or both.

15. A non-transitory tangible computer-readable storage medium having executable computer code stored thereon, the code comprising a set of instructions that, when executed by one or more processors, causes a computer to:

obtain data indicative of a plurality of check-ins and check-outs at an entity having a location and having operating hours;

aggregate the data over a first aggregation period and a second aggregation period, the first and second aggregation periods being determined based at least in part on an expected difference in operating hours of the entity during the first aggregation period relative to the second aggregation period;

when the plurality of check-ins and check-outs at the entity are greater than a threshold, determine from the aggregated data a first start time, a first end time, or both, for the first aggregation period from the aggregated data; and determine the operating hours of the entity for the first aggregation period based at least on the first start time, the first end time, or both.

16. A computer-implemented method for determining the operating hours of an entity, comprising:

obtaining, by one or more processors, one or more timestamps associated with an entity having a location and operating hours;

aggregating, by the one or more processors, the one or more timestamps over at least two aggregation periods, the at least two aggregation periods being determined based at least in part on an expected difference in operating hours of the entity between the at least two aggregation periods;

when the number of timestamps is greater than a threshold, determining, by the one or more processors, the operating hours of the entity during each of the at least two aggregation periods based at least in part on the one or more timestamps, the operating hours comprising a start time and an end time;

comparing, by the one or more processors, the one or more timestamps to the start time to determine a first conflict between the one or more timestamps and the start time for each of the at least two aggregation periods;

comparing, by the one or more processors, the one or more timestamps to the end time to determine a second conflict between the one or more timestamps and the end time for each of the at least two aggregation periods; and providing a notification to a user based on the first conflict, the second conflict, or a combination thereof.

17. The computer-implemented method of claim 16, wherein the notification comprises a notification for the user to contact the entity.

* * * * *